No. 696,262. Patented Mar. 25, 1902.
M. W. PALMER.
BEET HARVESTER.
(Application filed Mar. 6, 1901.)
(No Model.) 5 Sheets—Sheet 1.
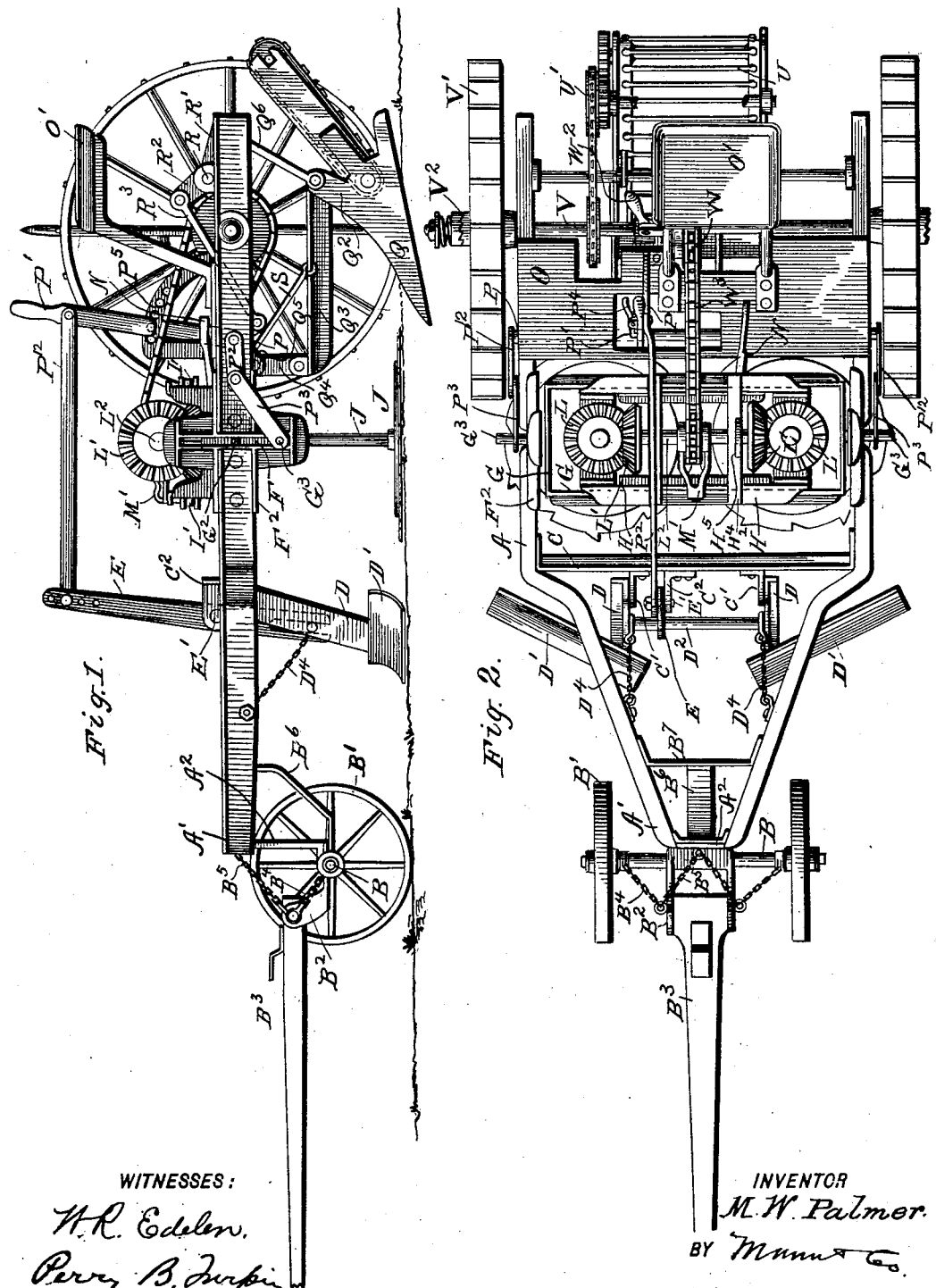
WITNESSES:
W. R. Edelen.
Perry B. Turpin.
INVENTOR
M. W. Palmer.
BY Munn & Co.
ATTORNEYS

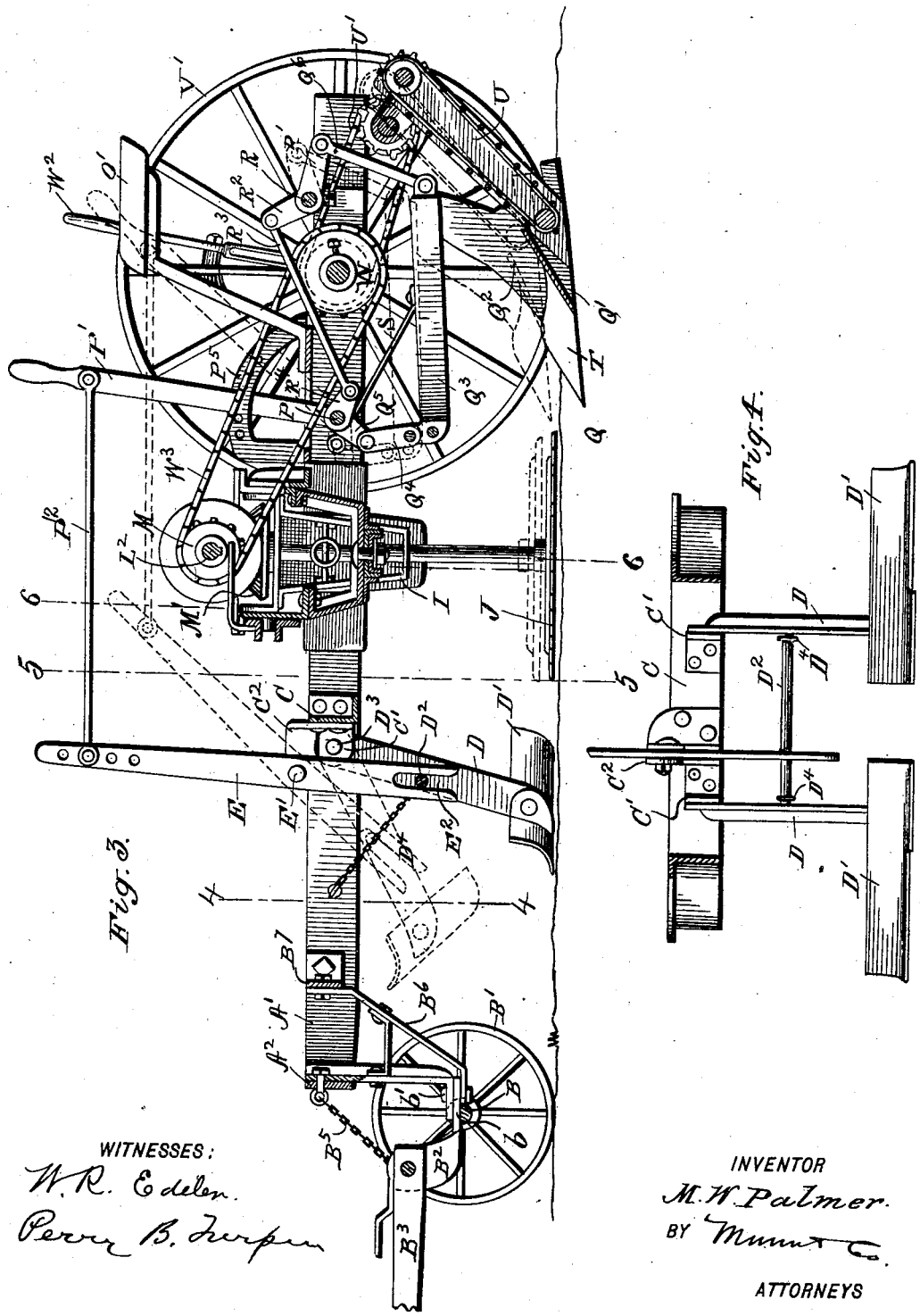

No. 696,262. Patented Mar. 25, 1902.
M. W. PALMER.
BEET HARVESTER.
(Application filed Mar. 6, 1901.)
(No Model.) 5 Sheets—Sheet 3.
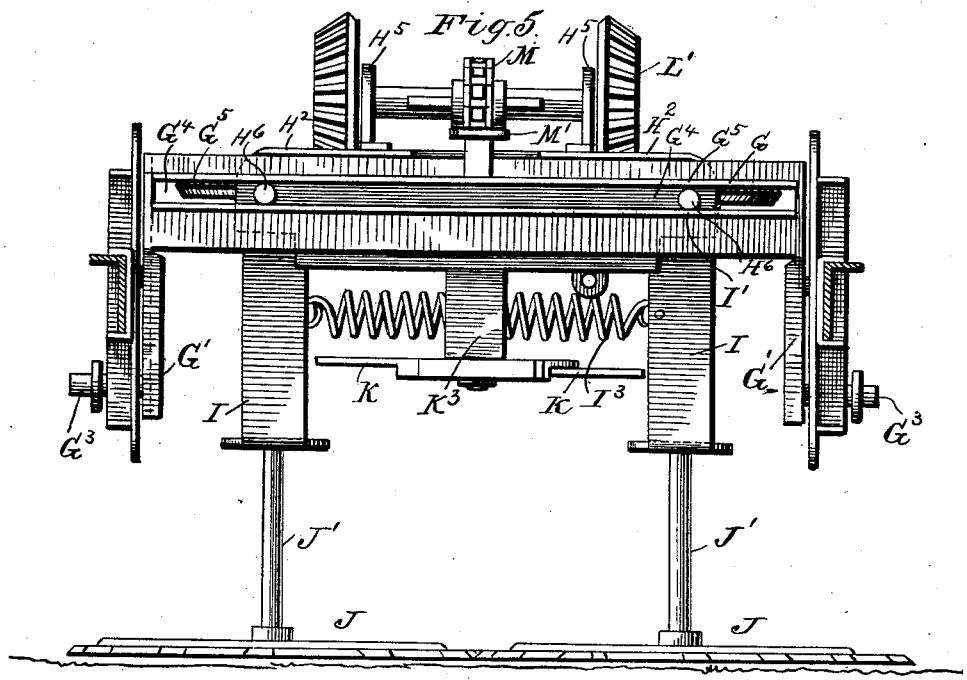
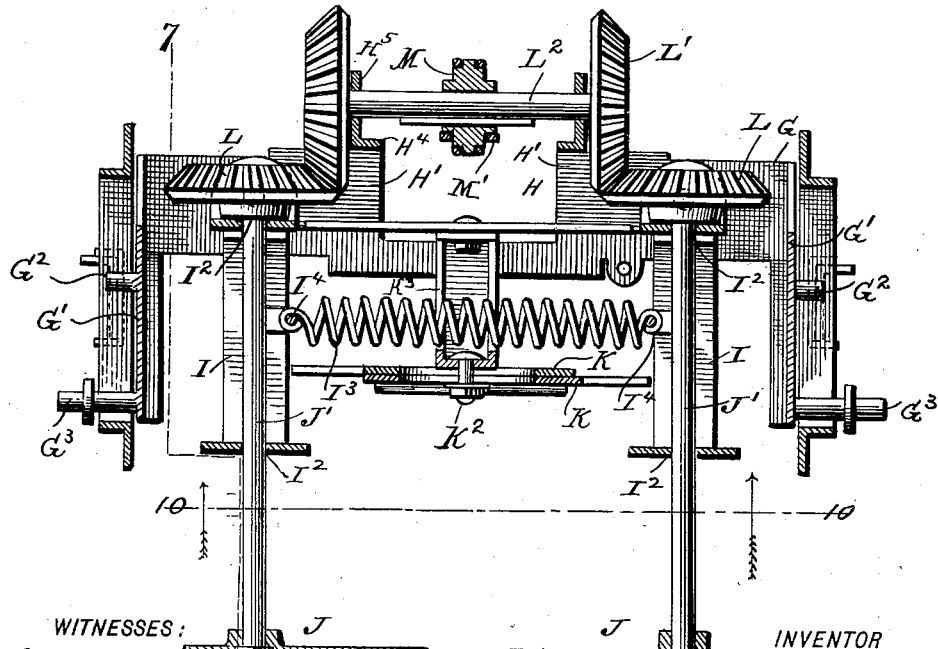
WITNESSES: INVENTOR
M. W. Palmer.
BY
ATTORNEYS No. 696,262. Patented Mar. 25, 1902.
M. W. PALMER.
BEET HARVESTER.
(Application filed Mar. 6, 1901.)
(No Model.) 5 Sheets—Sheet 4.
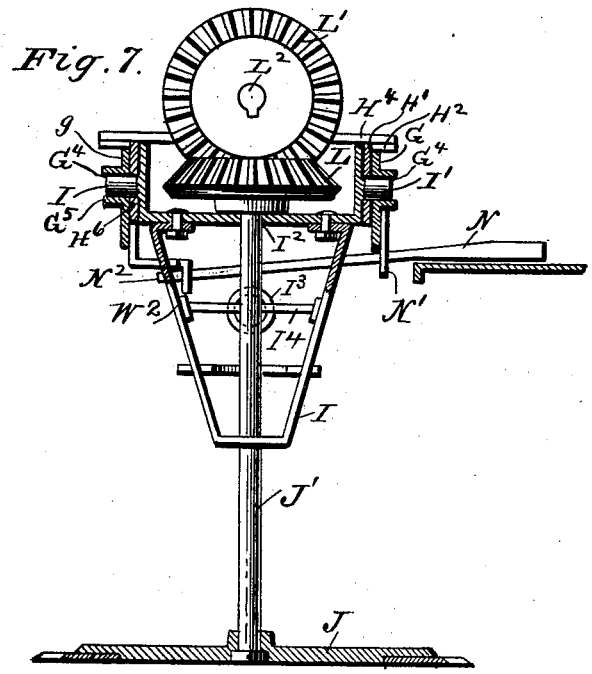
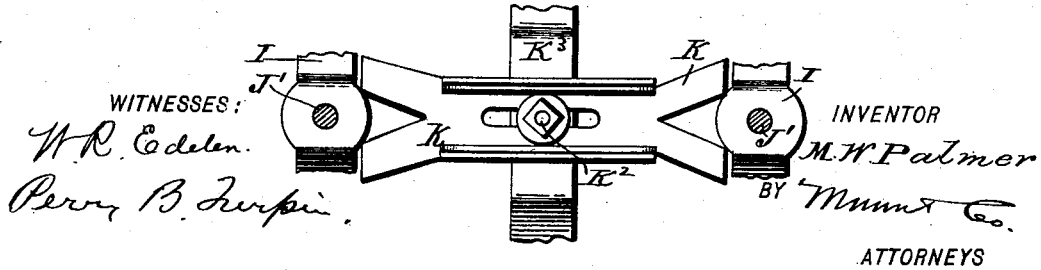
WITNESSES:
W. R. Edelen.
Perry B. Turpin.
INVENTOR
M. W. Palmer
BY Munn & Co.
ATTORNEYS No. 696,262. Patented Mar. 25, 1902.
M. W. PALMER.
BEET HARVESTER.
(Application filed Mar. 6, 1901.)
(No Model.) 5 Sheets—Sheet 5.
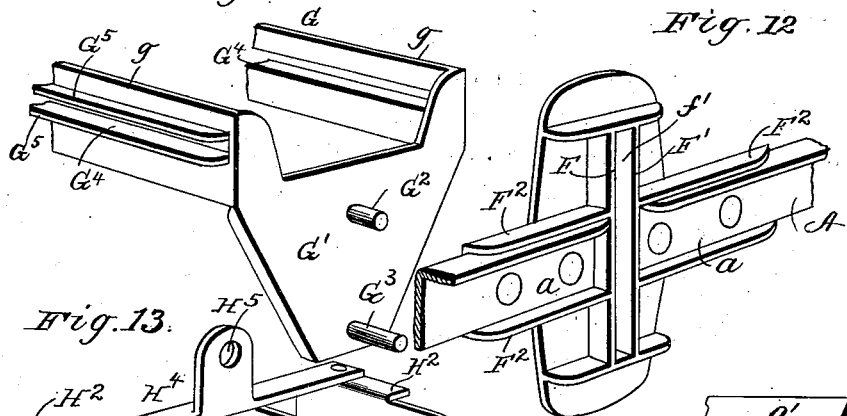
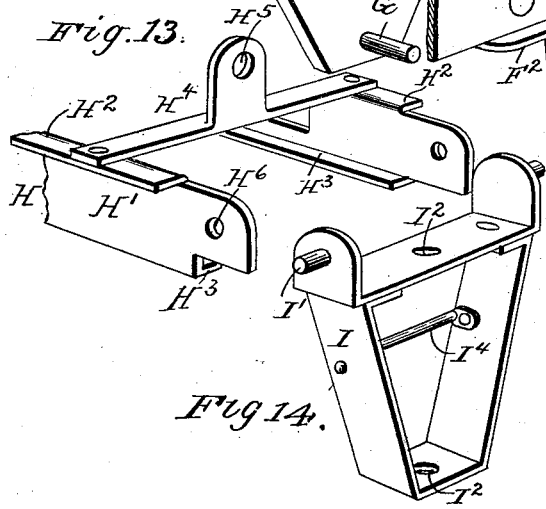
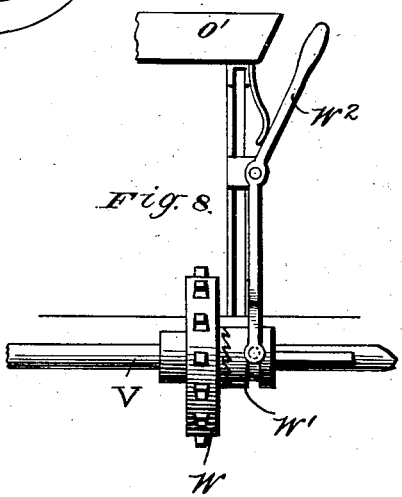
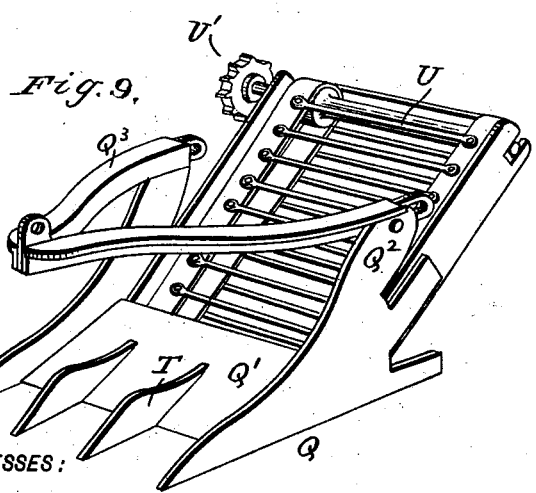
WITNESSES:
H. R. Edelen
Percy B. Turpin
INVENTOR
M. W. Palmer.
BY Munn & Co.
ATTORNEYS

UNITED STATES PATENT OFFICE.

MERRITT W. PALMER, OF HAMILTON, MICHIGAN, ASSIGNOR OF ONE-FOURTH TO RICHARD N. DE MERELL, OF HOLLAND, MICHIGAN.

BEET-HARVESTER.

SPECIFICATION forming part of Letters Patent No. 696,262, dated March 25, 1902.

Application filed March 6, 1901. Serial No. 50,051. (No model.)

*To all whom it may concern:*

Be it known that I, MERRITT W. PALMER, a citizen of the United States, residing at Hamilton, in the county of Allegan and State of Michigan, have made certain new and useful Improvements in Beet-Harvesters, of which the following is a specification.

This invention is an improvement in beet-harvesters, and has for an object, among others, to provide a novel construction by which to cut the tops from the beets, clear the path for such cutters in advance of the operation of topping the beets, raise the beets to the surface of the ground in rear of the topping-cutters, clear the dirt from the beets, and deposit the beets on the ground where they can be readily picked up; and the invention consists in certain novel constructions and combinations of parts, as will be hereinafter described and claimed.

In the drawings, Figure 1 is a side elevation, Fig. 2 a plan view, and Fig. 3 a vertical longitudinal section, of a harvester embodying my invention. Fig. 4 is a detail cross-sectional view on about line 4 4 of Fig. 3. Fig. 5 is a cross-sectional view on about line 5 5 of Fig. 3. Fig. 6 is a cross-sectional view on about line 6 6 of Fig. 3. Fig. 7 is a cross-sectional view on about line 7 7 of Fig. 6. Fig. 8 is a detail rear elevation showing the clutch mechanism for keying the drive-sprocket on the drive-shaft. Fig. 9 is a detail perspective view of the combined plow and elevator. Fig. 10 is a cross-sectional view on about line 10 10 of Fig. 6. Fig. 11 is a detail perspective view of one end of the carrier-frame. Fig. 12 is a fragmentary perspective view showing that portion of the main frame which provides guides for the carrier-frame. Fig. 13 is a detail perspective view of one end of the laterally-movable plow-frame. Fig. 14 is a detail perspective view of one of the rocking brackets for supporting the shafts of the cutters.

In carrying out my invention I provide a main frame having side bars A, which may converge toward their front ends $A'$, where there is provided a dropped portion $A^2$, which operates at its rear end to rest upon the axle B, which carries the front wheels $B'$. The axle B is provided with forwardly-projecting hounds $B^2$, to which is pivoted the tongue $B^3$, and chains $B^4$ brace the hounds from the axle near the ends of the latter, while chains $B^5$ extend from the hounds upwardly to the front end $A'$ of the main frame. The axle B is braced from the rear by a bar $B^6$, which extends from beneath the axle rearwardly and thence upwardly and connects with the cross-bar $B^7$, extending between the side bars A near their front ends, as shown in Figs. 2 and 3. In pivoting the axle B it is preferred to fix it rigidly to the plate $b$, from which the hounds $B^2$ extend and to project the said plate $b$ in rear of the axle and perforate it for the passage of the king-bolt $b'$, as will be best understood from Figs. 2 and 3.

At a point just in rear of that where the bars A begin to converge I connect them by a cross-beam C, which is provided between its ends with lugs $C'$ and $C^2$. These lugs project forwardly, and to the lugs $C'$, I pivot the upper ends of arms D, which are provided at their lower ends with the scrapers $D'$ and are connected between their ends by a cross-bar $D^2$, tying the arms D together so they will move together as they are rocked upon their pivotal connection at $D^3$ with the lugs $C'$ of the cross-bar C. The scrapers $D'$ are in the form of moldboards, are spaced apart at their inner ends, such space being in the center of the machine on a line drawn from front to rear, and the said scrapers incline from their inner ends rearwardly toward their outer ends, as will be understood from Figs. 1 and 2. The purpose of these scrapers is to clear a track for the cutters presently described, when they are lowered to the position shown in Fig. 1, and when lowered to this position the scrapers are stayed in place by means of chains $D^4$, which extend from the cross-bar $D^2$ forwardly and upwardly and are made fast to beams A of the main frame, as shown in Figs. 1 and 2. It will be noticed that the scrapers may be raised from the position shown in Figs. 1 and 3 clear of the ground, as indicated in dotted lines, Fig. 3. For this purpose I provide a lever E, which is pivoted at $E'$ to the lug $C^2$ and is engaged at its lower end with the cross-bar $D^2$, preferably by slotting the lever E at $E^2$ to straddle the bar $D^2$, as shown. By rocking the lever E on its pivot $E'$ the cross-bars can be set up or down, as desired. I operate this lever E by suitable connection with the main lever, which will be presently described. In rear of crossbar C, I provide the main frame with vertical guides F for the carrier-frame. The specific construction by which I secure this guide is shown in detail in Fig. 12 and consists of a plate F', provided with a vertical slot forming the guide F, and having on its outer side lateral projecting flanges $f'$, prolonging the walls of the slot F, and horizontal flanges $F^2$, extending on opposite sides of the slot F and receiving the ends $a$ of sections of the side bars A of the main frame, which are fitted in the recesses formed by the flanges $F^2$ and securely bolted or riveted in place. This forms a simple and strong construction which can be readily made and conveniently applied for use.

The carrier-frame G, one end of which is shown in detail in Fig. 11, is provided with end plates G', on which are provided the lateral projecting studs or projections $G^2$ and $G^3$, which project into the guide-slot F and permit the vertical adjustment of the carrier-frame, as may be desired. The said studs $G^2$ and $G^3$, standing one above the other, prevent any rocking of the carrier-frame and preserve the same in position at all times. This frame G supports the cutters which are carried by a cutter-frame, and the cutter-frame H, one end of which is shown in detail in Fig. 13, is movable laterally in the carrier-frame G, this lateral movement of the cutter-frame and the vertical movement of the carrier-frame being independent of each other. In effecting the lateral movement of the cutter-frame I provide the carrier-frame with horizontally-extended guides $G^4$, which are preferably in the form of slots, the carrier-frame being reinforced above and below such slots by the flanges $G^5$, as shown in Fig. 11.

The cutter-frame H comprises the bars H', which fit close to the inner sides of the cross-bars of the carrier-frame and are provided with flanges $H^2$, which rest and slide upon the bars $g$ of the carrier-frame. The lower edges of the bars H' of the cutter-frame are provided with inwardly-projecting bracing-flanges $H^3$, as shown in Fig. 13, and the bars H' are joined by connecting-bars $H^4$, which support bearings $H^5$ for the cross-shaft for driving the cutters. Near their ends the bars H' of the cutter-frame are provided with bearings $H^6$, in which journal studs I' of the brackets I and the studs I' preferably project beyond the bars H' and enter the guides $G^4$ of the carrier-frame and operate to support the cutter-frame slidably within the carrier-frame, as will be understood from Fig. 7. The brackets I are provided with vertical bearings $I^2$ for the upright shafts J' of the cutters J, and these brackets I can rock upon their studs I' to permit the adjustment of the cutters together or apart. The opposite brackets I are connected together by a spring $I^3$, which tends to draw them toward each other, and yet permits them to adjust to permit the passage between them of stones or other unyielding obstructions. The spring $I^3$ preferably connects with rods $I^4$, supported in the brackets between their ends. To limit the inward movement of the brackets I, I provide a stop consisting of sections K K, slotted at their inner ends and adjustably supported at such ends by means of a bolt $K^2$, carried on a yoke $K^3$, supported by the cutter-frame. At their outer ends the bars K are arranged for abutment by the brackets I, and they may be adjusted upon each other to permit the brackets I to move nearer together, so the stops can be arranged to permit the desired inward movement of the brackets as cutters are worn away. It will be noticed thus that I provide spring devices for drawing the brackets toward each other and stop devices for limiting such movement, as may be desired. It will also be noticed that I provide the carrier-frame, which is adjustable vertically in the main frame, and a cutter-frame, which is adjustable laterally in the vertically-adjustable carrier-frame, thus permitting the lowering of the cutters to the position for use and the shifting laterally of such cutters to bring them in line with the plants in the row.

For shifting the cutter-frame laterally I may employ a foot-lever N, (see Fig. 7,) fulcrumed at N' to the carrier-frame and arranged at $N^2$ to engage the cutter-frame, so it can shift the latter laterally to cause it to follow the beet-row in case the latter is crooked; but in most cases the cutters will adjust themselves automatically to follow the rows without the necessity of shifting the cutter-frame by any separate operating devices.

In rear of the carrier-frame I provide on the main frame a table O, on which is mounted the driver's seat O' and beneath which extends the main shaft P of the main lever P'. This shaft P is journaled to the main frame and has fixed to it the lever P', which may operate to rock the shaft P, and this lever P' is connected by the link $P^{12}$ with the lever E, so it can operate the latter. The shaft P is provided at its ends with cranks $P^2$, which are connected by links $P^3$ with the studs $G^3$ of the carrier-frame, so the rocking of the shaft P will operate to raise or lower the carrier-frame to adjust the cutters up or down, as may be desired. The lever P' is provided with a detent $P^4$, operating in connection with a segment $P^5$ to secure the lever in any desired adjustment.

The plow or digger Q is formed with a moldboard Q' and standards $Q^2$ at the sides thereof, which standards are secured at the rear ends of the beams $Q^3$, which are supported at their front ends, which converge, by the link $Q^4$ from a crank-arm $Q^5$ on the shaft P, as shown in Fig. 3, so the rocking of the shaft P may also operate to raise and lower the front end of the beam. At its rear end the plow is supported by a link Q⁶ from a crank R' on a counter-shaft R, which also has a crank-arm R², connected by a link R³ with a crank-arm R⁴ on the shaft P, so the shaft P may also operate to raise and lower the rear end of the plow. I brace the plow-beams Q³ between their ends from the main frame by means of the rods S, as shown in Figs. 1 and 3. The plow is provided upon its moldboard Q' with the ribs T, which extend in advance of the front edge of the moldboard and operate to break up the dirt which is raised with the beets and permit the beets to slide up onto the elevator U, which is carried at the rear end of the plow, inclines upwardly, and is formed with an endless slatted apron, which permits the dirt to drop through and carries the beets upward and discharges them upon the ground, where they can be easily picked up. The elevator is provided on one of its shafts with a gear-wheel U', suitably geared, so the carrier will be driven as desired.

The axle V is provided with the drive-wheels V', which may be suitably clutched at V², so they will not operate the axle V when the machine is backed, and upon the axle is fitted loosely the sprocket-wheel W, and a clutch-section W' is arranged for operation, as shown in Fig. 8, to clutch the wheel W to the shaft V whenever desired, the clutch-lever W² extending adjacent to the driver's seat O', as shown in Figs. 1, 2, and 8. A sprocket-belt W³ connects the pulley W with the pulley M, which operates to drive the cutters before described.

It will be noticed that by means of the lever P', I can raise the scrapers, the cutters, and the plow at the same time and can also lower the said bars in using, thus enabling the instant setting up of the operating-bars into and out of position for use. It will also be noticed that the meeting edges of the cutters are arranged in line with the space between the inner edges of the scrapers and that the plow operates in rear of the cutters in such manner as to elevate the beets which have been cropped by the cutters.

The opposing cutters J and their shafts J' and the supporting-brackets for said shafts, the springs connecting said brackets, and the stop devices between the opposite brackets form the subject-matter of a separate application for patent, Serial No. 75,671, filed by me in the Patent Office September 20, 1901.

Having thus fully described my invention, what I claim as new, and desire to secure by Letters Patent, is—

1. In a beet-harvester, the combination as herein described of the main frame having upright guides, the carrier-frame movable vertically in said guides, the cutter-frame movable laterally in the carrier-frame, the cutters carried by the cutter-frame, and means for operating the cutters, substantially as described.

2. The combination in a beet-harvester of the main frame, the vertically-movable carrier-frame, the cutters, the scrapers, the pivoted arms carrying the scrapers, the main lever, and means whereby the main lever may operate to adjust the carrier-frame and the scrapers, substantially as set forth.

3. The combination in a beet-harvester of the scrapers, the cutters, a carrier-frame for said cutters which is adjustable vertically, the plow in rear of the cutters, and a main shaft provided with crank-arms connected with the plow, and with crank-arms connected with the vertically-movable carrier-frame, a main lever on said shaft and intermediate devices between said main lever and the scrapers, substantially as set forth.

4. The combination in a beet-harvester, substantially as herein described, of the main frame, the scrapers, the pivoted arms carrying the scrapers, connections between said arms, the lever for adjusting the scrapers, the main shaft, the main lever on said shaft, connections between said main lever and the scraper-adjusting lever, crank-arms on the shaft, a vertically-movable carrier-frame connected with the crank-arms of the main shaft, the plow, a crank-arm on the main shaft connected with said plow, a counter-shaft, crank-arms on said counter-shaft and main shaft, connections between said crank-arms, and crank-arms on the counter-shaft connected with the plow, substantially as set forth.

5. A beet-harvester, substantially as described, comprising the framing, the supporting-wheels, the scrapers, the cutters in rear of the scrapers, the plow in rear of the cutters, and means whereby the said scrapers, cutters and plow may be jointly raised and lowered, substantially as set forth.

6. In a beet-harvester, substantially as herein described, the combination of the main frame, the scrapers, the arms supporting the scrapers and pivoted at their upper ends, the lever arranged at one end to operate the scrapers, the cutters, the carrier-frame adjustable vertically in the main frame, the cutter-frame adjustable laterally in the carrier-frame, the main shaft having a main lever connected with the scraper-adjusting lever, crank-arms on the main shaft, devices connecting certain of said crank-arms with the carrier-frame, the plow-frame, and connections between said plow-frame and certain of the crank-arms on the main shaft, all substantially as and for the purposes set forth.

7. In a beet-harvester the combination of the vertically-movable carrier-frame, the main frame comprising guide-plates having vertical slots for projections on the carrier-frame, and horizontal flanges on opposite sides of said slots, and frame-bars fitting between said flanges, and the cutting devices supported by the carrier-frame, substantially as set forth.

8. The combination of the main frame having guide-slots, the carrier-frame having end plates provided with projections operating in said slots and the cutter-frame in said carrier-frame, substantially as set forth.

9. The combination of the carrier-frame having its cross-bars provided with longitudinal slots, the cutter-frame fitting in said carrier-frame and comprising a main portion, and end brackets provided with pivoted studs entering bearings in the main portion and projecting into the guide-slots of the carrier-frame, and the cutter-shafts journaled in said brackets, substantially as set forth.

10. The combination in a beet-harvester of the carrier-frame having its cross-bars provided with longitudinal slots, the cutter-frame having bars fitting within the carrier-frame and provided with flanges overlying the cross-bars thereof, and projections from the cutter-frame entering the slots of the carrier-frame, and the cutters and their shafts, substantially as set forth.

11. The combination substantially as herein described, of the carrier-frame, the cutter-frame adjustable laterally therein and provided with pivoted brackets, the cutter-shafts journaled in said brackets, and the opposing cutters on said shafts composed each of blades having projecting teeth and notches, the teeth of one cutter being arranged to enter the notches of the opposing cutter, substantially as set forth.

12. In a beet-harvester, the combination substantially as described, of the main frame, the cutter-frame, movable laterally in the main frame, the cutters having their shafts provided with bevel-pinions, the shaft journaled to the cutter-frame and having gears meshing with the pinions of the cutters, a sprocket-gear on said shaft, a forked guide on the carrier-frame embracing said sprocket-gear, and the sprocket-chain and drive devices, substantially as set forth.

MERRITT W. PALMER.

Witnesses:
   GEO. E. KOLLEN,
   IRA PALMER.